3,355,663
WAVEGUIDE ECHO MEASUREMENT SYSTEM
Ethan Aronoff, Jackson Heights, N.Y., assignor to The
 Western Union Telegraph Company, New York, N.Y.,
 a corporation of New York
Filed July 20, 1964, Ser. No. 383,868
6 Claims. (Cl. 324—58)

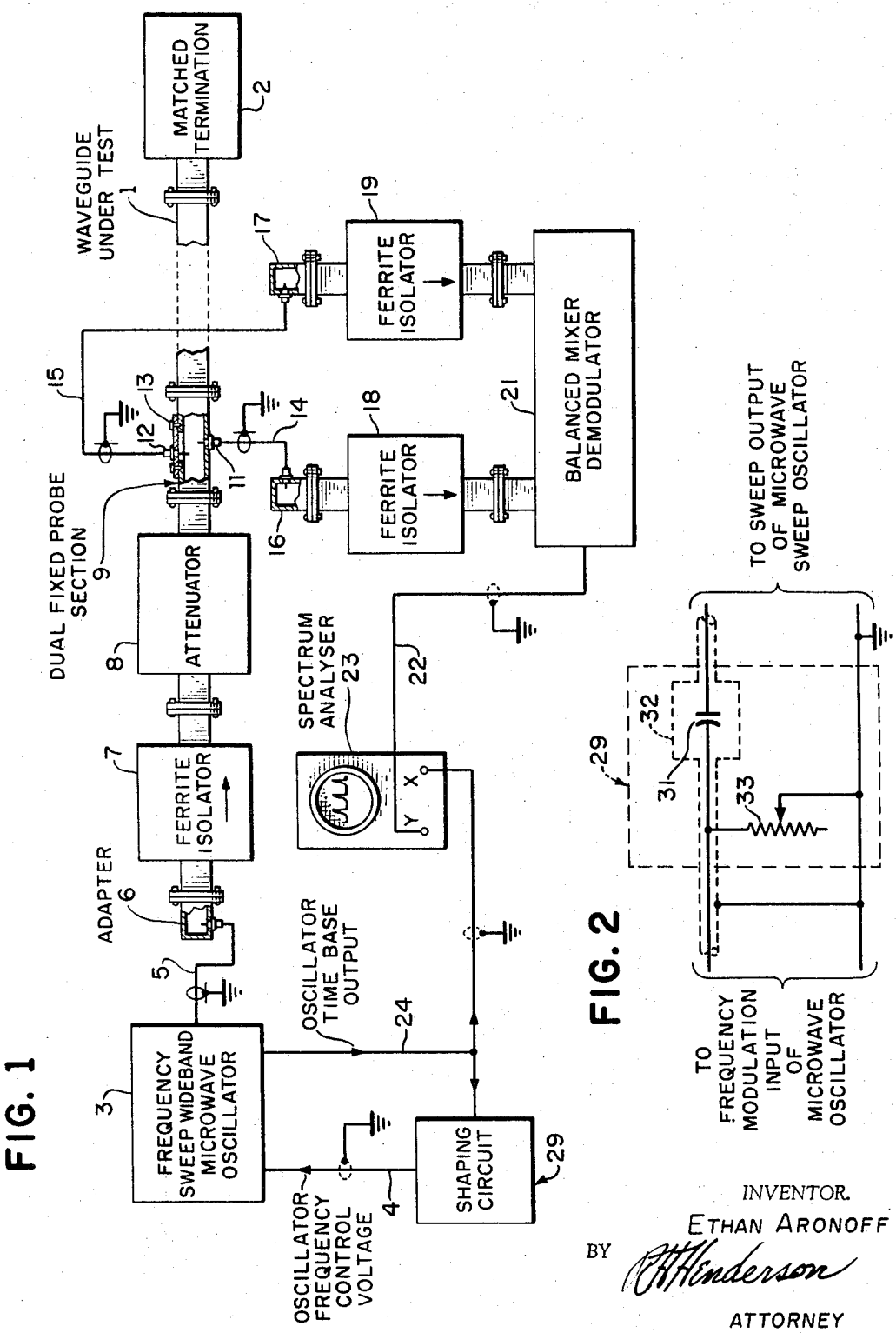

ABSTRACT OF THE DISCLOSURE

Phase and amplitude display system for simultaneously assessing in situ plural discontinuities present in a broadbanded microwave communication waveguide installation. Garbling factors are depicted in a drawing or map-like display of improved clarity and precision, through the use of dual electrostatic waveguide pickup probes in quadrature, an exponential sweep voltage produced in a standardizable shaping circuit, and the elimination of need for specially terminating the remote end of the guide.

Summary of the invention

This invention relates to the measurement of the properties of waveguides used for electromagnetic microwaves, and more particularly to a means for identifying, locating, and accurately evaluating discontinuities occurring in a relatively long assembly of fabricated waveguide sections.

Intelligence transfer by the broadband modulation and transmission of a microwave carrier now is widely used, and during the manipulation of these signals at the terminal stations, it is convenient to confine them in conductive waveguide pipes, because of the low losses, absence of leakage, and good power handling ability which this method of conduction provides.

Since such a waveguide is in fact a conduit for the traveling electromagnetic wave, any projection, irregularity, or discontinuity therein will, unlike the case in an ordinary electrical circuit, cause a reflection of energy back toward the source. Such discontinuities may occur, for example, when a number of fabricated waveguide sections of twelve foot length are bolted together by means of their flanged connections to provide an assembly at the transmitting station which may exceed three hundred feet in length. Each such joint produces some reflection, and if inaccurately assembled, an intolerable amount of reflection may result.

The undesirable results of such reflections include not only the obvious loss of energy, which however, is not large, but the damaging influence on stability which they can exert on the carrier generator, and especially the anomalous phase dislocations which they produce in a broadband transmission. This latter effect of phase distortion is of crucial importance in facsimile and video transmission, and since the amount of distortion introduced by such a reflective discontinuity is approximately proportional to the fourth power of the reflection coefficient, it is clear that when waveguide joints are as numerous as in the example aforementioned, some means of measuring their properties with a good degree of accuracy is required, in order to assure system performance.

Discontinuities other than joints, such as dents, shavings and burrs also contribute to reflections, and it therefore is necessary to be able to locate and identify the particular discontinuity being measured by reference to its position along the waveguide, without ambiguity, and preferably without employing a complex or difficult procedure.

Large reflections, as may be produced by improper making up of a joint resulting in joint failure, also require that means be provided for testing waveguide assemblies in situ in order to detect and locate such major sources of system failure.

Such measurements have heretofore been made by a complicated laboratory procedure which involves insertion of the particular discontinuity-bearing section under test into a short-circuited line equipped with a calibrated traveling probe, plotting a series of observed probe voltages for a variety of shorting positions, and determining the reflection coefficient by computation. While capable of satisfactory accuracy, such a procedure is unsuited to field use because of its physical requirement of an adjustable, shorted line beyond the discontinuity, and especially because it is incapable of measuring one discontinuity in the presence of others, such as frequently may be encountered in practice.

It therefore is a purpose of this invention to provide means for rapid and accurate evaluation of the electrical smoothness of microwave conduits in respect to both magnitude and location of electrical discontinuities therein.

Another purpose is to provide such means operable in the presence of plural discontinuities.

Another purpose is to provide such means operable to measure small discontinuities in the simultaneous presence of large discontinuities.

Another purpose is to provide such means operable to measure small discontinuities.

Another purpose is to provide such means operable to measure small as well as large discontinuities with a high degree of accuracy.

Another purpose is to provide such means operable for the aforesaid purposes which requires no access to the termination normally encountered in a microwave conduit installation.

Another purpose is to provide such means operable by a simplified technique.

A clearer understanding of the invention may be had by reference to the following detailed description of the preferred embodiment of a single specific illustrative example thereof as depicted in the attached drawings wherein:

FIG. 1 depicts a waveguide echo measurement system according to the present invention; and FIG. 2 is a circuit diagram of a portion of the instant invention.

Turning now to the drawings, there is seen in FIG. 1 a depiction of the preferred arrangement for the measurement of the degree and the location of discontinuities existing in a piece of waveguide 1 under test. Such a waveguide may be one having the conventional rectangular cross sectional shape such as the type shown, or it may equally well be of round or elliptical section provided only that suitable transition pieces of the kind well known in the art are employed, as needed, to couple the waveguide under test to the remainder of the associated equipment. Any electromagnetic wave conduit of appropriate parameters may in fact be measured in this way, as for example coaxial conduits, dielectric guides, and the like, so that the means to be described are quite universal in their applicability.

A termination 2 matched to the characteristic impedance of the conduit under test is shown affixed to the remote end thereof. Such may be either an energy sink of usual kind, as will be available and used in the laboratory or it often may comprise merely the termination components normally associated with the waveguide 1 when in place in an actual field installation. Since components of this kind usually are reasonably well matched to the impedance of the guide because of practical considerations respecting operation, it will be clear that the measurement of waveguides in situ in an existing operative installation, which may be relatively inaccessible at the terminal end of the guide, thereby becomes a practical advantage of the instant arrangement.

Microwave energy from the oscillator 3 of commercially available and unmodified kind, is swept in frequency by a control voltage applied to it over the shielded cable 4 from a shaping circuit component 5 later described. A wideband sweep may be employed, or a narrower band of sweep may be employed with the center frequency thereof adjusted during operation to encompass a wide band, as required for the complete evaluation of modern microwave communications conduits, without disturbing the efficiency or accuracy of the following measuring equipment, and as heretofore could not be done with measuring equipment used for these purposes which employs traveling coaxial probes.

The said energy from oscillator 3 is applied through a coaxial cable 5 and a adapter 6 for coupling it to a waveguide conduit, to the isolator 7 which is conveniently of the ferrite type. Such isolators are used here and elsewhere as described herein for the purpose of avoiding interaction within the components of the measuring system of waves traveling in different directions, as caused by the reflections to be measured.

The said energy is further applied from the output of attenuator 8 to the dual fixed probe section 9 comprising the fixed probe 11 and the adjustably fixed (although not variable during measurement) probe 12. The probes 11 and 12 of the dual fixed probe section (of waveguide) 9 are electrostatic pickup probes of adjustable depth of insertion into the guide. Probe 11 is fixedly located, and probe 12 is adjustable by means of retaining screws such as 13 to a location along the guide which is removed from that of probe 11 by a distance of one quarter wavelength, in terms of wavelength within the guide, at the center frequency of interest. Because of the fact that probes 11 and 12 are of the electrostatic field pickup type, they are responsive only to electrostatic fields in the guide, which is in contrast to the usual arrangement made for measurements of this nature wherein an electromagnetic field pickup loop, which is somewhat responsive to both electromagnetic and electrostatic fields, is employed to provide a detection signal of troublesome ambiguity. It is in part because of this employment of dual electrostatic pickup probes which are separated by a quarter wavelength that the novel advantage of wideband operation is obtained in the instant invention, and in other part for reasons later explained.

Leading from the probes 11 and 12 are the coaxial cables 14 and 15 respectively, to the adapters 16 and 17, the isolators 18 and 19, and the mixer 21.

Mixer 21 is a waveguide device having a positive and a negative type rectifying crystal installed in circuit with the picked-up microwave signal from probes 11 and 12 respectively. The frequency of oscillator 3 being time-swept, as before mentioned, two signals differing in frequency, one direct and one reflected from the discontinuity being measured, appear at each pickup probe. Because of the specified space displacement of the said probes, the difference frequency signals due to the reflection from the discontinuity are combined by summation in the mixer 21. Amplitude modulation of the microwave oscillator 3 is thus suppressed to the point of virtual elimination through the use of balanced mixer demodulator 21, thereby greatly increasing the sensitivity of the measurement. The difference in frequency of the signals aforesaid which appear at each probe, is dependent upon the sole variable of distance to the discontinuity, and after their passage through demodulator 21, their difference beat frequency is readily displayed on spectrum analyzer 23 in well known manner, or measured with any desired degree of accuracy by conventional means to determine the distance along guide 9 to the discontinuity of interest. The amplitude of any such beat frequency arising from a discontinuity is found to be directly related to the standing wave ratio introduced into the guide 9 by the discontinuity, thus providing the basis for a natural-appearing and conventionally arranged display on the spectrum analyzer 23 as well as a relatively pure and stable voltage for measurement in computing the standing wave ratio and reflection coefficient of this discontinuity by simplified formulae.

The fact that mixer 21 is a waveguide device as before mentioned, renders it unnecessary to use any impedance matching devices in connection therewith, such as the "balun." The bandwidth limitations of the balun thereby are avoided, and the advantage of broadband operation secured.

Such signal, being of relatively low frequency, is led through the shielded cable 22 to the spectrum analyzer 23 which is of the usual kind for producing a visual display of amplitude as a function of frequency in cartesian coordinates. The frequency involved is of course, that produced in demodulator 21 as a low frequency beat, and bears no direct relation to that of microwave oscillator 3. As a matter of practical convenience, however, oscillator 3 does provide an additional output in the form of a linear time base sweep voltage on the shielded cable 24 which is utilized to effect horizontal deflection of the beam in spectrum analyzer 23. The consequent display thus is one of waveguide discontinuities in the form of vertical spikes having amplitude in accordance with the magnitude of the discontinuity which each represents, and being located horizontally each in accordance with its distance from the beginning of the waveguide under test. It will be obvious that in cases where greater precision of measurement is desired than can be obtained by the use of a spectrum analyzer, it may be replaced by a wave analyzer for measuring the amplitude and frequency of the signal on cable 22 to a high degree of accuracy, and the fault location and magnitude computed therefrom.

When measurements of such accuracy are sought, it becomes apparent that the output of the swept microwave oscillator 3 is in fact a frequency modulated wave having the distributed spectrum which is characteristic thereof. Moreover, it is found that the phase velocity of the several frequency components of the modulated wave within the waveguide differ according to their frequency, so that a broadening and diffusion of energy in the traveling wave occur, which depends in amount directly upon the distance to the measured fault. This constitutes an impairment of the resolving power of the measurement system which can be minimixed in some degree by utilizing frequencies well above the cutoff frequency of the guide. A more powerful corrective which may be applied in addition thereto, however, is reshaping the F.M. envelope to a more advantageous function than the simple linear sawtooth formerly employed. This has been done by generating a repetitive modulating voltage of the desired characteristics by a specially designed and rather complex sweep circuit incorporated in a swept microwave oscillator of special construction. I find, however, that a remarkably close approximation of the ideal modulating voltage can be obtained by reshaping the linear sawtooth output of a commercial microwave sweep oscillator by means of a simple and compact auxiliary circuit about to be described.

The swept microwave oscillator 3 of commercially available kind commonly comprises a backward wave oscillator tube for the generation of microwaves, having a helical electrode whose potential is varied to provide frequency modulation of the microwave output. The relationship which exists between modulating voltage and output frequency is not linear, however, but is such that an exponentially decreasing helix voltage produces a linearly decreasing output frequency. A modulating voltage conveniently generated as a linear sawtooth waveform is therefore modified to approximate exponential form by circuitry involving a series of diode clipper circuits in the customary manner. The result of modulation by such a wave as in commercial oscillator 3, is a microwave output whose frequency varies linearly with time.

As previously noted, such a function is unsatisfactory for the instant purposes, and must be replaced by an output frequency varying exponentially as a function of time, in order to produce a constant beat frequency from a given discontinuity. Such variation may be either an increasing or a decreasing exponential, but since the latter is more readily generated by the instant arrangement, it is presently preferred.

It is found that by inserting a shaping network in series with the existing diode shaping network on the oscillator, not only can great simplification of the required circuitry be obtained, but advantage may be taken of the expirically constructed diode network which is custom made to linearize and thus standardize the output of the traveling wave tube in each oscillator, thereby enabling a stock shaping circuit assembly to be used on any such oscillator of a given kind, without any necessity for individual adjustment thereto.

By such an arrangement the electrical characteristics of the instant shaping network combine with the arbitrarily selected non-reciprocal characteristics of the existing oscillator shaping network to produce a helix voltage of a very complex nature which is individual to each oscillator tube, and thus incapable of rational analysis on any practical basis.

I have found, however, that a simple circuit exists having arbitrary and substantially constant parameters which, in combination with the diode shaping network, is capable of providing the individual helix voltage function required by such tubes in order to generate the desired output frequency-time function.

There is seen in FIG. 2 the circuit diagram of such circuit wherein numeral 31 designates a capacitor of about one fourth microfarad, interconnecting the linear sweep output circuit of the oscillator 3 and the frequency modulation input voltage terminals thereof, the said capacitor being a part of the entire shaping network generally designated 29. It has been found to be necessary for the correct operation of the device that an electrostatic shield 32 be applied around the capacitor 31 and the wiring associated directly therewith. The resistor 33 is variable, of about one tenth megohm, and is operated in the following manner.

It will be appreciated that while reflections detected from a waveguide discontinuity are detected after a delay or travel time which is nominally constant throughout the sweep cycle of the microwave generator, in fact, the group velocity of microwaves in a guide is a sufficient function of the instantaneous microwave frequency to introduce a discrepancy in the delay, and hence in the beat frequency indicative of fault location, between the start and the end of the microwave sweep. It is by shaping the microwave frequency-time relationship to an appropriate exponential function that this discrepancy can be minimied. Variation of the function is required, however, for each different fault distance, if optimum correction is to be secured. This is accomplished by the adjustment of resistor 33. When a display of a fault reflection indication is observed on the screen of a cathode ray oscilloscope synchronized with the oscillator sweep, a sinusoidal pattern having a decrement and a progressive compression of period is seen. By suitable adjustment of the single control 33, this may be converted to a constant sinusoid of single frequency. If a wave analyzer is used as an indicator, it is quite feasible simply to set resistor 33 at that value producing maximum amplitude and minimum frequency spread of the beat frequency. When using the spectrum analyzer shown at 23, proper adjustment of the resistor 33 is indicated by a minimum number of sharp and discrete spikes of maximum amplitude on the display screen.

Although this invention has been described in terms of a specific illustrative example of the preferred embodiment thereof, it will be understood that various alternatives, modifications and elaborations will occur to those skilled in the art, which do not depart, however, from the essential spirit of the invention. It is therefore intended that the invention shall be limited only by the appended claims.

What is claimed is:

1. In a system for evaluating the parameters of an electromagnetic wave conduit having partially reflective portions, a free and a remote end, and an energy absorptive termination at the remote end, frequency modulable generating means for an electromagnetic wave having a normally repetitive and decreasing linear frequency dependence upon time and having a sweep output potential means corresponding thereto, dual probe means comprising a length of waveguide and a pair of electrostatic pickup probes adjustably mounted therein, the said pickup probes being spaced longitudinally distant one quarter wavelength in the waveguide from each other, the said dual probe means interconnecting said generating means and the said free end of said wave conduit, indicator means connected to said sweep output potential means of said generator means for waveguide discontinuity evaluation, balanced mixer demodulating means interconnecting said pickup probes and said indicator means and a wave shaping circuit comprising an adjustable resistor and a capacitor and having an input connected to said sweep output means and an output connected to said generating means for modulating the frequency thereof to produce an electromagnetic wave output whose frequency has an exponential dependence upon time whereby the output of said demodulating means is rendered substantially invariant in frequency and amplitude.

2. In a system for evaluating the parameters of an electromagnetic wave conduit having partially reflective portions, a free and a remote end, and an energy absorptive termination at the remote end, frequency modulable generating means for an electromagnetic wave, having a normally repetitive and decreasing linear frequency dependence upon time and having a sweep output potential means corresponding thereto, dual probe means comprising a length of waveguide and a pair of electrostatic pickup probes adjustably mounted therein, the said pickup probes being spaced longitudinally distant one quarter wavelength in the waveguide from each other, the said dual probe means interconnecting said generating means and the said free end of said wave conduit, indicator means connected to said sweep output potential means of said generator means for waveguide discontinuity evaluation, balanced mixer demodulating means interconnecting said pickup probes and said indicator means, and a wave shaping circuit comprising a network consisting of an adjustable resistor and a shielded capacitor and having an input connected to said sweep output means and an output connected to said generating means for modulating the frequency thereof to produce an electromagnetic wave output whose frequency has an exponential dependence upon time.

3. A microwave measurement device for wave conduits comprising a microwave oscillator having an internal linear frequency sweep, an input connection for modulation thereof and an output connection for the linear sweep voltage thereof, probe means comprising a section of waveguide and a pair of electrostatic probes adjustably mounted therein and longitudinally separated a quarter wavelength, interconnecting said oscillator and said wave conduit, indicator means for determining the frequency and amplitude of a beat note, balanced demodulator means interconnecting said probe means and said indicator means, and a network comprising a series capacitor followed by a variable shunt resistor connected from said output connection to said input connection of said oscillator whereby the frequency of said beat note is rendered substantially invariant.

4. A microwave measurement device for wave conduits comprising a microwave oscillator having an internal linear frequency sweep, an input connection for modulation thereof and an output connection for the linear sweep voltage thereof, probe means comprising a section of waveguide and a pair of electrostatic probes mounted therein and longitudinally separated a quarter wavelength, interconnecting said oscillator and said wave conduit, indicator means for determining the frequency and amplitude of a beat note, balanced demodulator means interconnecting said probe means and said indicator means, and a network comprising a shielded series capacitor and a variable shunt resistor connected from said output connection to said input connection of said oscillator whereby the frequency of said beat note is rendered substantially invariant.

5. Waveguide discontinuity reflection coefficient measuring and locating means comprising in combination a frequency modulable microwave sweep oscillator having an internal linear frequency sweep, a connection for external modulation thereof, and a separate sawtooth output, waveguide dual probe means interconnecting said oscillator and said waveguide and comprising a section of waveguide, a pair of electrostatic pickup probes in said section, said probes being separated by a distance along the waveguide equal to one quarter wavelength of the microwaves in the waveguide at the center frequency of said sweep, balanced diode demodulator means connected to said dual probe means for producing a beat note having a relatively constant amplitude and a median frequency corresponding to the location of said discontinuity indicator means for observing said median frequency, connected to said balanced demodulator means, and a network comprising a shielded series capacitor and a variable shunt resistor interconnecting said sawtooth output and the said external frequency modulation connection of said sweep oscillator.

6. Waveguide discontinuity reflection coefficient measuring and locating means comprising in combination an externally frequency modulable microwave sweep oscillator having a linear frequency sweep and a separate sawtooth output, waveguide dual probe means interconnecting said oscillator and said waveguide and comprising a section of waveguide, a pair of electrostatic pickup probes in said section, said probes being separated by a distance along the waveguide equal to one quarter wavelength of the microwaves in the waveguide at the center frequency of said sweep, balanced demodulator means connected to said dual probe means for producing a beat note having a relatively constant amplitude and a median frequency corresponding to the location of said discontinuity indicator means for observing said median frequency, connected to said balanced demodulator means and a network comprising a shielded series capacitor and a variable shunt resistor interconnecting said sawtooth output and the external frequency modulation of said sweep oscillator.

References Cited

UNITED STATES PATENTS

| 2,442,606 | 6/1948 | Korman | 324—58 XR |
| 2,580,678 | 1/1952 | Hansen et al. | 324—58 |
| 2,654,863 | 10/1953 | Riblet | 324—58 |

OTHER REFERENCES

Hewlett-Packard application note No. 54, pages 1–5, November 1961.

RUDOLPH V. ROLINEC, *Primary Examiner.*

WALTER L. CARLSON, *Examiner.*

PAUL F. WILLE, *Assistant Examiner.*